United States Patent
Kasugai

(10) Patent No.: US 11,943,534 B2
(45) Date of Patent: Mar. 26, 2024

(54) IMAGING DEVICE

(71) Applicant: Panasonic Intellectual Property Management Co., Ltd., Osaka (JP)

(72) Inventor: Hiroki Kasugai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 553 days.

(21) Appl. No.: 17/263,603

(22) PCT Filed: Nov. 29, 2019

(86) PCT No.: PCT/JP2019/046836
§ 371 (c)(1),
(2) Date: Jan. 27, 2021

(87) PCT Pub. No.: WO2020/129576
PCT Pub. Date: Jun. 25, 2020

(65) Prior Publication Data
US 2021/0297581 A1 Sep. 23, 2021

(30) Foreign Application Priority Data

Dec. 19, 2018 (JP) ................................. 2018-237627

(51) Int. Cl.
*H04N 23/67* (2023.01)
*G08B 3/10* (2006.01)
(Continued)

(52) U.S. Cl.
CPC .............. *H04N 23/67* (2023.01); *G08B 3/10* (2013.01); *G10H 1/0008* (2013.01); *G10K 15/04* (2013.01); *G10H 2210/586* (2013.01)

(58) Field of Classification Search
CPC .......... H04N 23/67; H04N 23/00; G08B 3/10; G10H 1/0008; G10H 2210/586;
(Continued)

(56) References Cited

U.S. PATENT DOCUMENTS

| 4,443,086 A | 4/1984 | Hosoe |
| 4,597,659 A * | 7/1986 | Suda ...................... G03B 17/20 396/296 |

(Continued)

FOREIGN PATENT DOCUMENTS

| JP | S55-155337 A | 12/1980 |
| JP | H06-214561 A | 8/1994 |

(Continued)

OTHER PUBLICATIONS

Office Action for corresponding Japanese Application No. 2020-561253 dated Apr. 25, 2023 and its English Machine Translation.

(Continued)

*Primary Examiner* — Shahbaz Nazrul
(74) *Attorney, Agent, or Firm* — Renner, Otto, Boisselle & Sklar, LLP

(57) ABSTRACT

An imaging device includes an image sensor, a controller, and an annunciator. The image sensor is configured to capture an object image entering via an optical system. The controller is configured to control focusing operation to focus the object image by the optical system. The annunciator is configured to output focusing sound that has a predetermined frequency characteristic according to the focusing operation. The frequency characteristic of the focusing sound includes a first sound component based on first frequency, and a second sound component based on second frequency that is higher than the first frequency and lower than twice frequency of the first frequency.

7 Claims, 7 Drawing Sheets

(51) Int. Cl.
*G10H 1/00* (2006.01)
*G10K 15/04* (2006.01)

(58) Field of Classification Search
CPC ....... G10H 2220/455; G10H 2250/371; G10H 1/08; G10K 15/04; G10K 15/02; G02B 7/28; G03B 13/36; G03B 17/18
See application file for complete search history.

(56) References Cited

U.S. PATENT DOCUMENTS

| | | | | |
|---|---|---|---|---|
| 5,689,741 | A * | 11/1997 | Hozumi | G02B 7/28 |
| | | | | 396/130 |
| 6,937,284 | B1 * | 8/2005 | Singh | H04N 23/635 |
| | | | | 348/346 |
| 9,094,601 | B2 * | 7/2015 | Chen | H04N 23/673 |
| 2004/0144240 | A1 * | 7/2004 | Iijima | G10H 5/06 |
| | | | | 84/698 |
| 2006/0044452 | A1 * | 3/2006 | Hagino | G02B 27/40 |
| | | | | 348/E5.045 |
| 2019/0014252 | A1 * | 1/2019 | Masuda | H04N 23/667 |

FOREIGN PATENT DOCUMENTS

| | | |
|---|---|---|
| JP | 2000-121921 A | 4/2000 |
| JP | 2004-145098 A | 5/2004 |
| JP | 2004-252041 A | 9/2004 |
| JP | 2008-513102 A | 5/2008 |
| JP | 2008-217026 A | 9/2008 |
| JP | 2011-178310 A | 9/2011 |
| JP | 2013-115841 A | 6/2013 |
| JP | 2018-113527 A | 7/2018 |
| WO | 2006/041449 A1 | 4/2006 |

OTHER PUBLICATIONS

International Search Report for corresponding Application No. PCT/JP2019/046836, dated Jan. 28, 2020.
Iwamiya, Shin-ichiro et al., "On the Effectiveness of Using Musical Chords for Auditory Signals", The Japanese Journal of Ergonomics (2009, vol. 45, No. 6, pp. 329-335, p. 330, right column, line 9 to p. 322, bottom line) with its Partial English translation.
English translation of the International Preliminary Report on Patentability Corresponding Application No. PCT/JP2019/046836 dated Jul. 1, 2021.

* cited by examiner

IMAGING DEVICE

TECHNICAL FIELD

The present disclosure relates to an imaging device that emits focusing sound that is a sound effect according to a time of focusing.

BACKGROUND ART

Conventionally, focusing sound has been used to notify a user that focus is achieved in an imaging device. For example, as in Patent Document 1, conventional focusing sound is constituted from combined sound (Non-Patent Document 1) in which a single tone with single frequency is emitted a plurality of times.

Patent Document 2 discloses a scale-sound generation device intended to eliminate unpleasantness when sound of a dissonant interval is generated in a time-announcing clock. The scale-sound generation device links each sound-scale of 12-sounds scale with each time corresponding to a fixed time, and controls a sound generator so as to generate sound-scale corresponding to the time whenever a basic sound, which is one of the 12-sounds scale, is generated. At this time, there is a case where a sound-scale of a dissonant interval is generated with respect to the basic sound. In such a case, the discomfort caused by the dissonant interval is eliminated by superimposing and generating sound of at least one harmonic-sound of a major 3 harmonic-sound or the like, including the sound-scale.

CITATION LIST

Patent Documents

Patent Document 1: JP 2000-121921 A
Patent Document 2: JP 2004-145098 A

Non-Patent Documents

Non-Patent Document 1: "Guidelines for alarm sounds for improving operability of home appliances", Universal Design Technical Committee, General Incorporated Foundation Association for Electric Home Appliances, March 2018
Non-Patent Document 2: Shin-ichiro Iwamiya, "Sound quality metrics: Introduction and applications", Journal of Acoustical Society of Japan, Volume 66, No. 12, 2010, p. 603-609.

SUMMARY

Conventionally, focusing sound is constituted from a combination of single tones having the same frequency, and has no particular dissonant interval. However, the present inventor has found a problem that conventional focusing sound gives a user discomfort, which is different from a dissonant interval, with impact in audibility, and has conducted intensive research to solve this problem.

The present disclosure provides an imaging device capable of relieving impact in audibility caused by focusing sound.

The imaging device of the present disclosure includes an image sensor, a controller, and an annunciator. The image sensor is configured to capture an object image entering via an optical system. The controller is configured to control focusing operation to focus the object image by the optical system. The annunciator is configured to output focusing sound that has a predetermined frequency characteristic according to the focusing operation. The frequency characteristic of the focusing sound includes a first sound component based on first frequency, and a second sound component based on second frequency that is higher than the first frequency and lower than twice frequency of the first frequency.

According to the imaging device of the present disclosure, it is possible to relieving impact in audibility caused by focusing sound.

DESCRIPTION OF EMBODIMENTS

Embodiments will be described in detail below with reference to the drawings as appropriate. However, there is a case where description detailed more than necessary is omitted. For example, there is a case where detailed description of a well-known item or duplicate description of substantially the same configuration is omitted. This is to prevent the following description from being unnecessarily redundant and to facilitate understanding by a person skilled in the art. Note that the inventor(s) provide(s) the accompanying drawings and the following description for a person skilled in the art to fully understand the present disclosure, and the accompanying drawings and the description are not intended to limit the subject matters described in the claims.

First Embodiment

In a first embodiment, a digital camera that performs focusing operation and outputs focusing sound will be described as an example of an imaging device according to the present disclosure. The digital camera according to the present embodiment is a lens-integrated digital camera.

1-1. CONFIGURATION

A configuration of the digital camera according to the first embodiment will be described with reference to FIG. 1.

Figure 1:
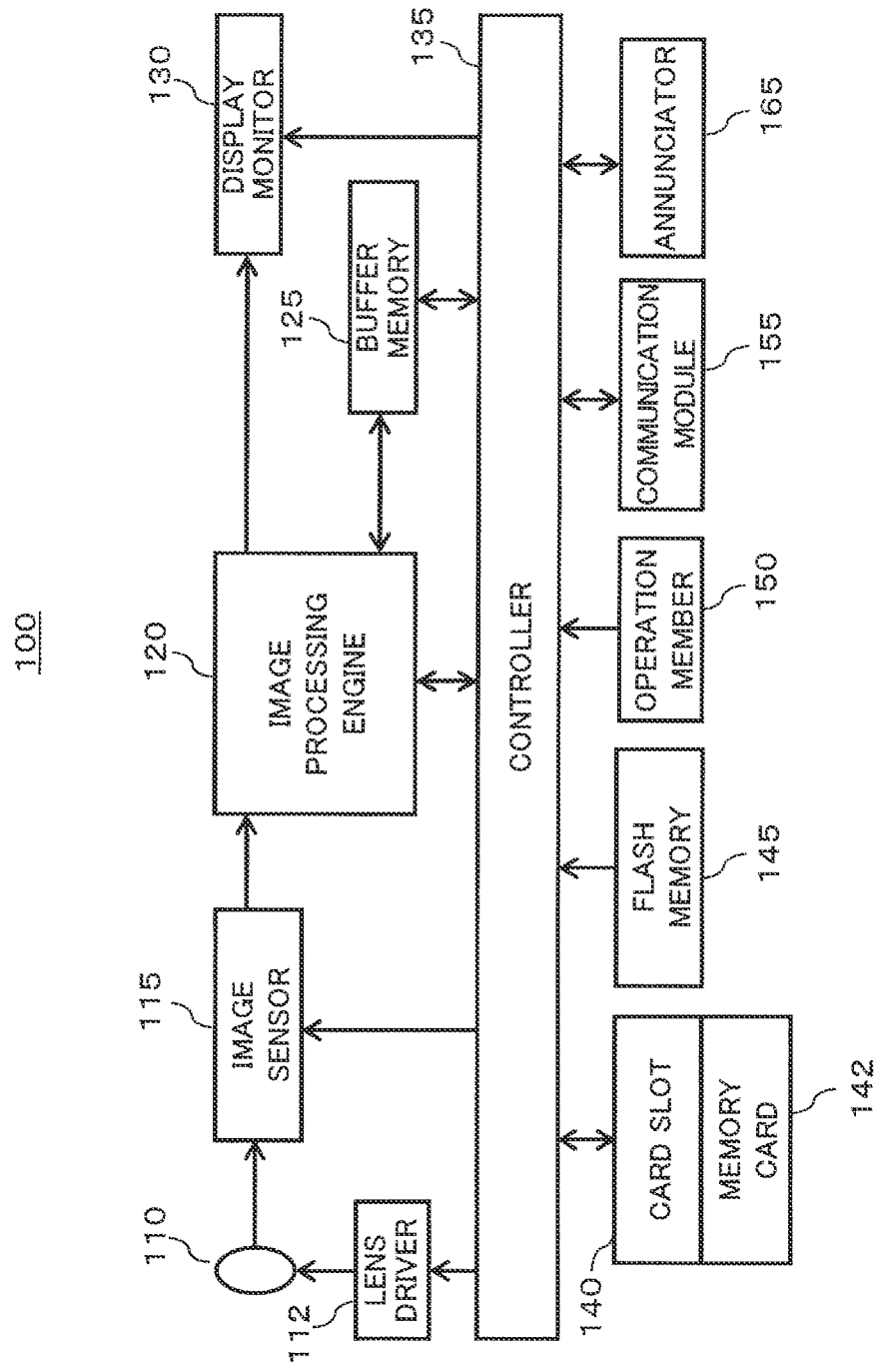
FIG. 1 is a diagram illustrating a configuration of a digital camera according to a first embodiment of the present disclosure.

FIG. 1 is a diagram illustrating a configuration of a digital camera 100 according to the present embodiment. The digital camera 100 according to the present embodiment includes an image sensor 115, an image processing engine 120, a display monitor 130, and a controller 135. Further, the digital camera 100 includes a buffer memory 125, a card slot 140, a flash memory 145, an operation member 150, a communication module 155, and an annunciator 165. Furthermore, the digital camera 100 includes, for example, an optical system 110 and a lens driver 112.

The optical system 110 includes a focus lens, a zoom lens, an optical image stabilization lens (OIS), an aperture, a shutter, and the like. The focus lens is a lens for changing a focus state of an object image formed on the image sensor 115. The zoom lens is a lens for changing a magnification of an object image formed by an optical system. The focus lens or the like includes one or a plurality of lenses each.

The lens driver 112 drives a focus lens and the like in the optical system 110. The lens driver 112 includes a motor and causes the focus lens to move along an optical axis of the optical system 110 on the basis of control of the controller 135. A configuration for driving a focus lens in the lens driver 112 can be implemented by a DC motor, a stepping motor, a servomotor, an ultrasonic motor or the like.

The image sensor 115 captures an object image formed via the optical system 110 to generate imaging data. The imaging data is image data indicating the image captured by the image sensor 115. The image sensor 115 generates image data of a new frame with a predetermined frame rate (e.g., 30 frames/second). The controller 135 controls timing of generating imaging data and operation of an electronic shutter in the image sensor 115. As the image sensor 115, various image sensors such as a CMOS image sensor, a CCD image sensor, or an NMOS image sensor can be used.

The image sensor 115 performs imaging operation of a still image, imaging operation of a through image, or the like. The through image is mainly a moving image, and is displayed on the display monitor 130 in order for a user to determine composition to for taking a still image. Each of the through image and the still image is an example of a captured image according to the present embodiment. The image sensor 115 is an example of the image sensor according to the present embodiment.

The image processing engine 120 performs various kinds of processing on the imaging data output from the image sensor 115 to generate image data, or performs various kinds of processing on the image data to generate an image to be displayed on the display monitor 130. The various kinds of processing include, but are not limited to, white balance correction, gamma correction, YC conversion processing, electronic zoom processing, compression processing, decompression processing, and the like. The image processing engine 120 may include a hard-wired electronic circuit, or may include a microcomputer using a program, a processor, or the like.

The display monitor 130 is an example of a display that displays various pieces of information. For example, the display monitor 130 displays an image (through image) indicated by the image data captured by the image sensor 115 and processed by the image processing engine 120. The display monitor 130 displays a menu screen or the like for the user to perform various settings for the digital camera 100. The display monitor 130 can include a liquid crystal display device or an organic EL device, for example. Note that, the digital camera 100 may include a viewfinder such as EVF while illustration is omitted in FIG. 1.

The operation member 150 is a general term for a hard key, such as an operation button or an operation lever, provided on an exterior of the digital camera 100, and receives operation by the user. For example, the operation member 150 includes a release button, a mode dial, or a touch-sensitive panel. When the operation member 150 receives operation by the user, the operation member 150 transmits an operation signal corresponding to the user operation to the controller 135.

The controller 135 entirely controls overall operation of the digital camera 100. The controller 135 includes a CPU or the like, and the CPU executes a program (software), by which a predetermined function is implemented. The controller 135 may include, instead of the CPU, a processor including a dedicated electronic circuit designed to implement a predetermined function. That is, the controller 135 can be implemented by various processors such as CPU, MPU, GPU, DSU, FPGA, or ASIC. The controller 135 may include one or more processors. The controller 135 may include one semiconductor chip along with the image processing engine 120, or the like. The controller 135 is an example of a controller.

The buffer memory 125 is a recording medium that functions as a work memory for the image processing engine 120 or the controller 135. The buffer memory 125 is implemented by a dynamic random access memory (DRAM), or the like. The flash memory 145 is a non-volatile recording medium. While not illustrated, the controller 135 may have various kinds of internal memories, such as a ROM. Various programs executed by the controller 135 are stored in the ROM. Furthermore, the controller 135 may include a RAM that functions as a work area of the CPU.

The card slot 140 is a means to insert a memory card 142 that is removable. The memory card 142 is electrically and mechanically connectable to the card slot 140. The memory card 142 is an external memory including a recording device therein, such as a flash memory. The memory card 142 can store data such as image data generated by the image processing engine 120.

The communication module 155 is a communication module (circuit) that performs communication compliant with the communication standards IEEE 802.11, a Wi-Fi standard, or the like. The digital camera 100 can communicate with another apparatus via the communication module 155. The digital camera 100 may communicate directly with another apparatus via the communication module 155, or may communicate via an access point. The communication module 155 may be connectable to a communication network such as the Internet.

The annunciator 165 is a module that converts sound data input from the controller 135 into sound and outputs the sound. The annunciator 165 includes a DA converter, a speaker, and the like. The DA converter converts a digital signal including sound data, which is input from the controller 135, into an analog signal. The speaker converts the analog signal input from the DA converter into sound and outputs the sound.

1-2. Operation

Operation of the digital camera 100 configured as the above will be described below.

Figure 2:
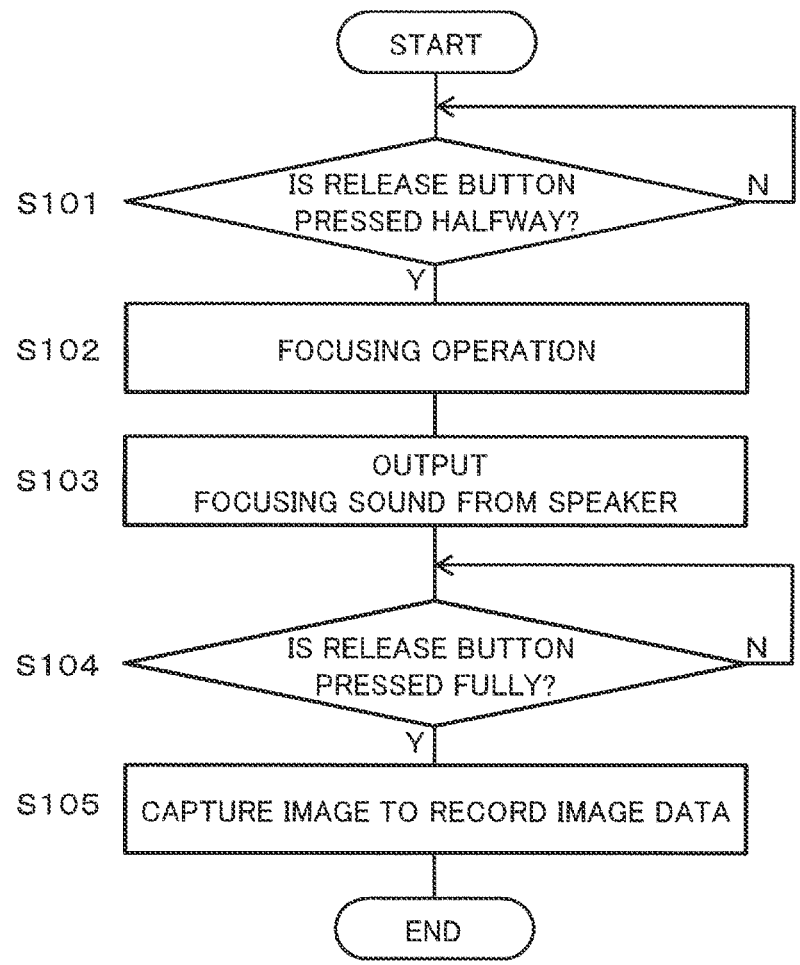
FIG. 2 is a flowchart illustrating operation of the digital camera.

FIG. 2 is a flowchart illustrating operation of capturing a still image by the digital camera 100. Each processing according to the flowchart in FIG. 2 is executed by the controller 135 of the digital camera 100. This flowchart is performed according to user operation after the digital camera 100 is started, for example.

At first, the controller 135 detects whether or not the release button on the operation member 150 is pressed halfway down (S101). The user can operate the release button when a desired object or the like is in the view, by looking through the viewfinder of the digital camera 100 or visually checking the display monitor 130, for example.

When the user presses the release button halfway down (YES in S101), the controller 135 controls focusing operation in which the lens driver 112 drives the focus lens of the optical system 110 to focus the object or the like (S102). In step S102, focusing may be performed on a predetermined area in the image as a focusing target, or image recognition of the object as the focusing target may be performed.

When the focusing operation is completed, the controller 135 outputs, from the annunciator 165, focusing sound notifying the user of completion of the focusing (S103). As will be described later, the digital camera 100 according to the present embodiment outputs focusing sound that is comfortable for the user to hear.

Furthermore, the controller 135 detects whether or not the release button is fully pressed down (S104). In a case where the release button is released from the half-press, the controller 135 detects the release of the half-press from the operation member 135, which allows a return to step S101.

When the controller 135 detects that the release button is fully pressed (YES in S104), the controller 135 controls imaging operation by the image sensor 115, and records, in the memory card 142 or the like, the image data as a result of the imaging (S105). Then, the processing according to this flowchart ends.

The focusing operation in step S102 may be one-shot AF or continuous AF. For example, in a case where the focusing operation is performed a plurality of times after the release button is pressed halfway down (YES in S102), the controller 135 may output focusing sound according to each focusing operation, or may restrict the output of the focusing sound as appropriate.

1-3. Focusing Sound

Focusing sound according to the present embodiment, which is output during operation of the digital camera 100 as described above (S103 in FIG. 2), will be described in detail below.

Figure 3A:
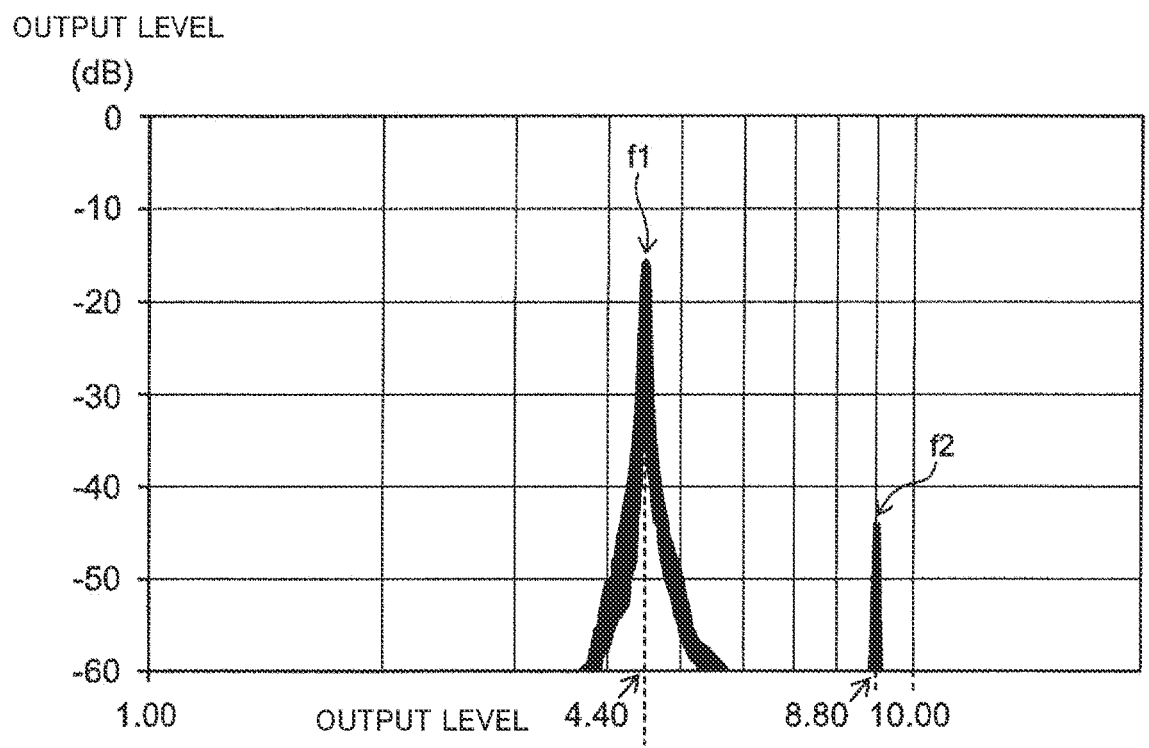
FIGS. 3A and 3B are diagrams for describing a frequency characteristic of focusing sound of the digital camera.
Figure 3B:
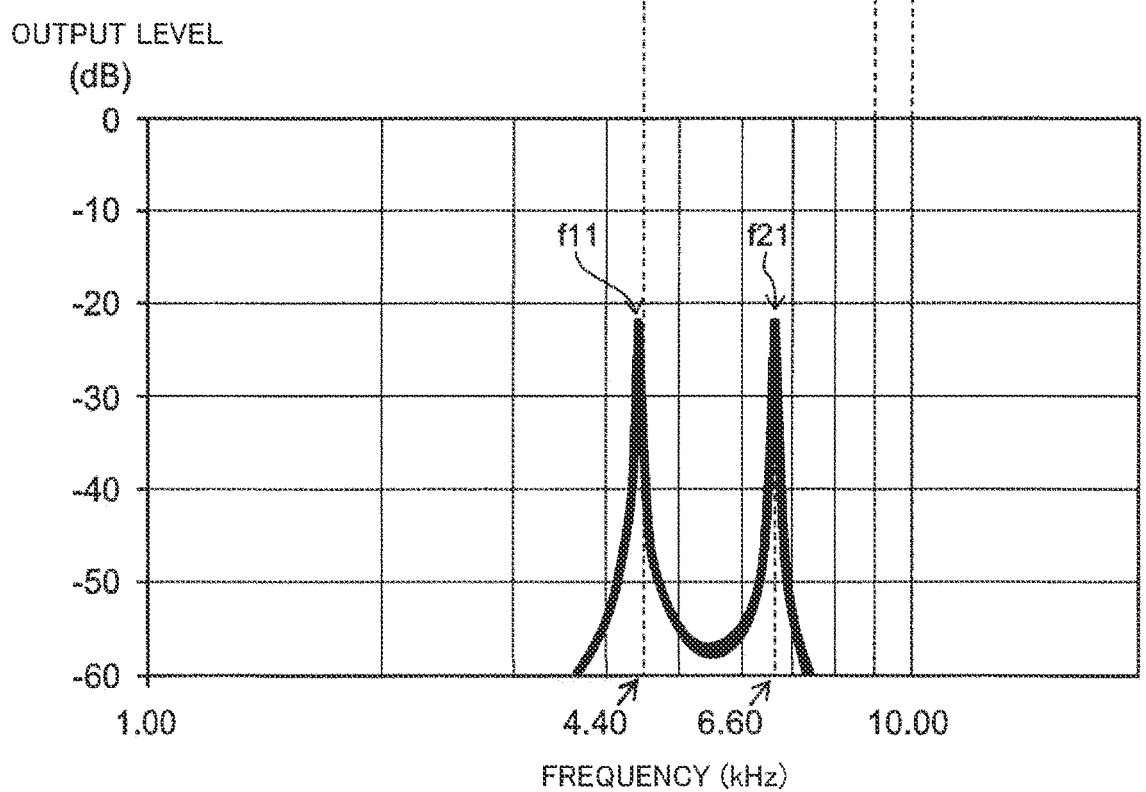

FIGS. 3A and 3B are diagrams for describing a frequency characteristic of focusing sound of the digital camera 100 according to the first embodiment. FIG. 3A exemplifies a frequency characteristic of focusing sound based on a single tone. FIG. 3B exemplifies a frequency characteristic of focusing sound according to the present embodiment. In FIGS. 3A and 3B, a horizontal axis indicates frequency, and a vertical axis indicates a sound output level (that is, corresponding to a sound pressure level).

Figure 4:
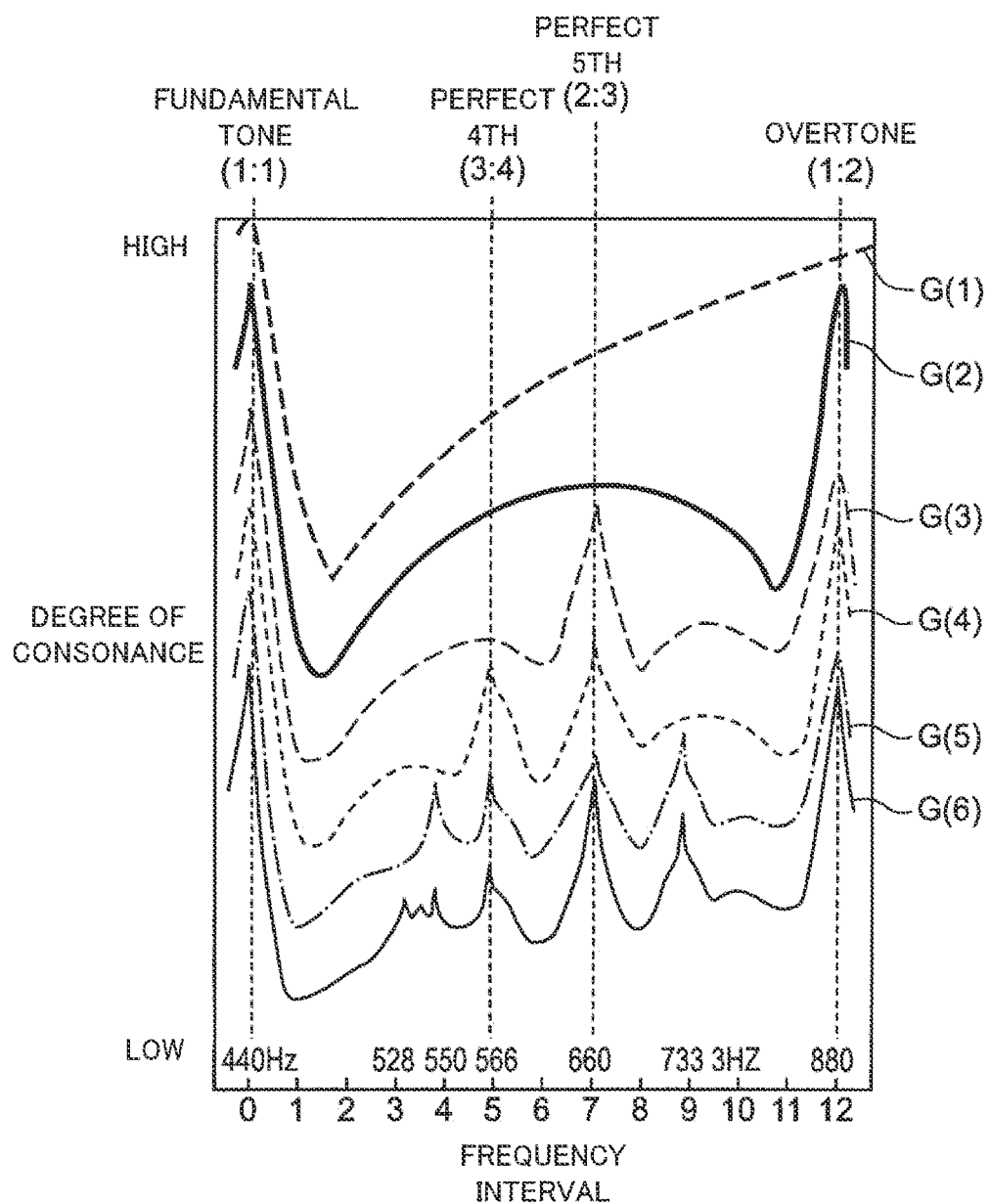
FIG. 4 is diagram illustrating a degree of consonance between two tones.

FIG. 4 is a diagram for describing a degree of consonance between two tones. The degree of consonance refers to, for example, a degree to which two tones sound beautifully in harmony. The degree of consonance as illustrated in FIG. 4 can be calculated by a prediction model such as the Kameoka model (refer to Non-Patent Document 2).

On the horizontal axis in FIG. 4, an interval between two tones are represented by the number of semitones, and frequency of a higher-pitched tone of two tones is exemplified. In the drawing, a ratio a:b exemplifies a frequency ratio of two tones. Each graph G(n) in FIG. 4 indicates a degree of consonance between two tones for the number of overtones n (=1 to 6). For example, graph G(1) is in consideration up to 880 Hz as the higher-pitched tone with respect to a fundamental tone of 440 Hz, wherein the fundamental tone is lower tone in the two tones, and graph G(4) is in consideration up to 3520 Hz as the higher-pitched tone with respect to the fundamental tone of 1760 Hz.

In the example in FIG. 3A, the focusing sound includes a frequency component f2 of 8.80 kHz in addition to a frequency component f1 for which a sound output level peaks at 4.40 kHz. Even in a case where single tone frequency is set for focusing sound, a frequency characteristic of output focusing sound may include a frequency component of an overtone that is an integral multiple of the set frequency, depending on performance of the speaker or the like. According to FIG. 4, the degree of consonance in this case is as high as that in a case where frequencies of two tones are the same.

As a result of intensive research by the present inventor, a problem has been revealed that focusing sound as illustrated in FIG. 3A has not only a high degree of consonance but also a high degree of straightness, which would give a user discomfort with ear-piercing impact in audibility. Such discomfort occurs regardless of presence or absence of the frequency component f2 of an overtone. It is considered that focusing sound is likely to give a strong impression to the user, since the user hears focusing sound near the speaker with looking at the object through the viewfinder, for example.

Meanwhile, in view of focusing sound as a sound effect for notifying the user that focus is achieved, it is considered that a strong impression of focusing sound is not necessarily an adverse effect. At present, each of camera manufacturers uses, as focusing sound, a combined sound based on a single tone having own selected frequency. It is difficult for a person skilled in the art to conceive an idea of drastically changing a frequency characteristic of focusing sound, due to the consideration that the tone color of focusing sound can have a brand value showing the individual manufacturer.

However, the present inventor has conducted intensive research on focusing sound from a viewpoint of the above problem, resulting in conceiving an idea that focusing sound is constituted from a frequency characteristic of a chord, such as a consonant chord without an overtone, instead of a frequency characteristic of a single tone. With such focusing sound, as illustrated in FIG. 4, while a degree of consonance is lower than a degree of consonance of an overtone, straightness can be reduced, so that the audible impact sounding ear-piercing to the user can be reduced. By further intensive research, the present inventor has achieved an idea of causing the digital camera 100 according to the present embodiment to output focusing sound, as exemplified with the frequency characteristic in FIG. 3B, for example.

In the present embodiment, focusing sound of the digital camera 100 is set to a consonant chord of a perfect fifth. In the example in FIG. 3B, focusing sound has a fundamental tone component f11 for which a sound output level peaks at frequency of 4.40 kHz, and a higher-pitched tone component f21 for which a sound output level peaks at frequency of 6.60 kHz. A frequency ratio of the fundamental tone component f11 to the higher-pitched tone component f21 is 2:3, thereby achieving a consonant chord of a perfect fifth. The fundamental tone component f11 is an example of a first sound component having peak frequency of the component f11 as first frequency. The higher-pitched tone component f21 is an example of a second sound component having peak frequency of the component f21 as second frequency.

It can be seen from FIG. 4 that a difference in a degree of consonance between a consonant chord and a dissonant chord is larger as the frequency is higher. The present inventor has also researched a possibility of giving the user uneasiness due to a too low degree of consonance. For example, the fundamental tone component f11 and the higher-pitched tone component f21 included in focusing sound may be a dissonant chord depending on a frequency ratio. According to focusing sound of a perfect fifth as an example, a next highest degree of consonance to a degree of consonance of an overtone in FIG. 4 can be obtained. Accordingly, the digital camera 100 according to the present embodiment can output focusing sound with which the user feels comfortable.

It is considered that as the frequency of focusing sound is higher, the digital camera 100 gives the user more of a feeling of speedy focusing, that is, a feeling that focusing operation is performed at a high speed. Here, it is concerned that the higher frequency has the stronger straightness, which might cause picky impact in audibility. In contrast to this, the digital camera 100 according to the present embodiment can obtain focusing sound that relieves impact in audibility as well as giving the feeling of speedy focusing, by a frequency characteristic such as a perfect fifth using high frequency as in FIG. 3B or the like. For example, in the example in FIG. 3B, an impression of recalling fineness of a machine may be obtained depending on how the higher-pitched tone sounds.

Figure 5A:
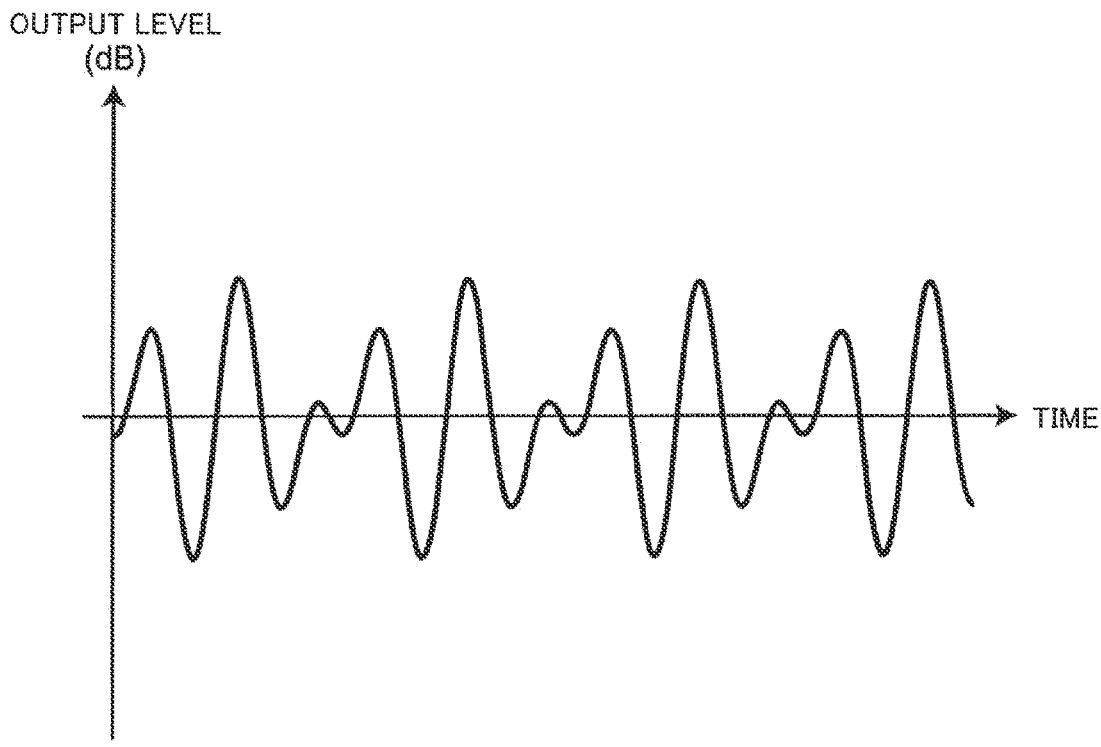
FIGS. 5A and 5B are diagrams for describing a waveform of focusing sound of the digital camera according to the first embodiment.
Figure 5B:
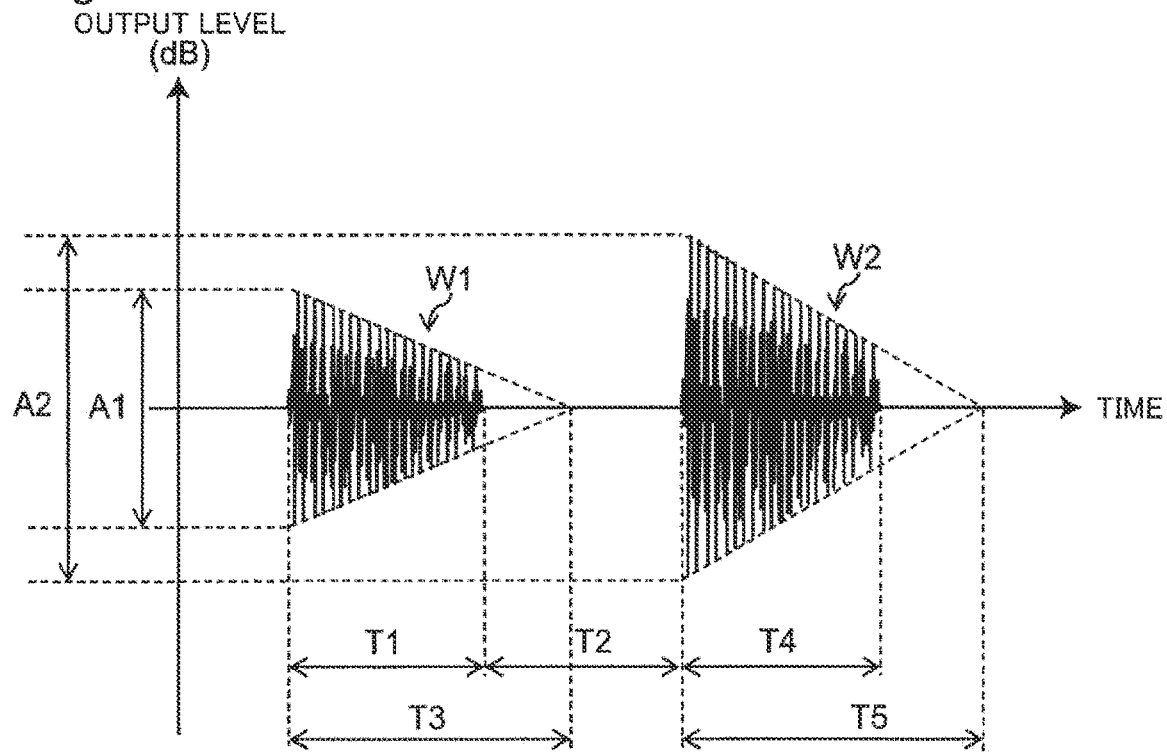

FIGS. 5A and 5B are diagrams for describing a waveform of focusing sound of the digital camera 100 according to the first embodiment. In FIGS. 5A and 5B, a vertical axis indicates a sound output level [dB], and a horizontal axis indicates time.

FIG. 5A is a waveform chart exemplifying a part of a waveform of the focusing sound of the digital camera 100 according to the present embodiment. Amplitude of the focusing sound of the digital camera 100 periodically changes at a longer cycle than a cycle of each of the fundamental tone component f11 and the higher-pitched tone component f21 by superposition with each other.

The digital camera 100 according to the present embodiment outputs focusing sound by emitting twice a sound wave having a frequency characteristic as described above. According to this, given an example that the focusing sound is expressed as "pi-pi" in onomatopoeia, it is possible to give the user an impression that focusing operation is completed (hereinafter referred to as a "focusing stop feeling") at timing when the user hears a latter half "pi".

FIG. 5B exemplifies an overall waveform chart of the focusing sound according to the present embodiment. As illustrated in FIG. 5B, the focusing sound of the digital camera 100 includes a first sound wave W1 and a second sound wave W2 output after the first sound wave W1.

The first sound wave W1 has amplitude A1 and the second sound wave W2 has amplitude A2. In the present embodiment, the amplitude A1 of the first sound wave W1 is set smaller than the amplitude A2 of the second sound wave W2, that is, the amplitude A2 is set larger than the amplitude A1. With this setting, sound heard in a latter half of the focusing sound can be emphasized, and thereby a focusing stop feeling can be improved.

Furthermore, in the present embodiment, the focusing sound is set to fade out by adding a fade toward an end in a waveform of each of sound waves W1 and W2. It is concerned that a chord constituting focusing sound might remain a feeling of uneasiness that a lingering tone is impure. In contrast to this, by applying the fade to the focusing sound, it is possible to resolve the above-described feeling of uneasiness, thereby achieving crispy focusing sound.

In the digital camera 100, sound data indicating a waveform of focusing sound as described above is stored in the flash memory 145 or the like in advance. The controller 135 of the digital camera 100 controls the annunciator 165 by using the sound data when the focusing sound is output (S102 in FIG. 2).

The annunciator 165 of the digital camera 100 outputs the first sound wave W1 for a time period T1, and outputs the second sound wave W2 for a time period T4 at an interval of a time period T2. The digital camera 100 outputs the first sound wave W1 by adding a fade with a constant gradient so that amplitude becomes 0 after a lapse of a time period T3, for example. Similarly, the digital camera 100 outputs the second sound wave W2 by adding a fade with a gradient so that amplitude becomes 0 after a lapse of a time period T5.

In the present embodiment, the time periods T1, T2, T4 are respectively 25 msec. T3 and T5 are 37.5 msec. The amplitude A2 of the second sound wave is substantially 3 dB greater than the amplitude A1 of the first sound wave. The user can obtain a finely focused impression by listening to the second sound wave after the first sound wave. According to the setting the amplitude A2 of the second sound wave to be greater than the amplitude A1 of the first sound wave, the above impression can be stronger.

3. SUMMARY

As described above, the digital camera 100 according to the first embodiment includes the image sensor 115, the controller 135, and the annunciator 165. The image sensor 115 captures an object image entering via the optical system 110. The controller 135 controls focusing operation to focus the object image by the optical system 110. The annunciator 165 outputs focusing sound that has a predetermined frequency characteristic according to the focusing operation. The frequency characteristic of the focusing sound includes a fundamental tone component based on the first frequency, and a higher-pitched tone component based on second frequency that is higher than the first frequency and lower than twice frequency of the first frequency.

According to this, while having a degree of consonance lower than a degree of consonance of an overtone, the digital camera 100 can reduce straightness, and can relieve audible impact that sounds ear-piercing to the user.

A first and second frequencies are set to cause the focusing sound to be a consonant chord with the fundamental tone component and the higher-pitched tone component.

According to this, the digital camera 100 can output focusing sound with which the user feels comfortable and has an impression of recalling fineness of a machine, owing to the focusing sound constituting a consonant chord.

The annunciator 165 outputs focusing sound so as to fade the focusing sound out.

According to this, the digital camera 100 can resolve a feeling of uneasiness that a lingering tone is impure, and can output crispy focusing sound.

Focusing sound includes the first sound wave W1, and the second sound wave W2 output at an interval of a time period after the first sound wave W1 is output, and amplitude of the second sound wave is greater than amplitude of the first sound wave.

According to this, the digital camera 100 can give the user a focusing stop feeling.

OTHER EMBODIMENTS

As the above, an embodiment has been described as exemplification of the techniques disclosed in the present application. However, the techniques in the present disclosure are not limited to this, and can be applied to an embodiment to which a change, replacement, addition, omission, or the like, can be made as appropriate. Furthermore, it is also possible to combine each component described in the above embodiment to form a new embodiment. Therefore, other embodiments will be exemplified below.

Figure 6A:
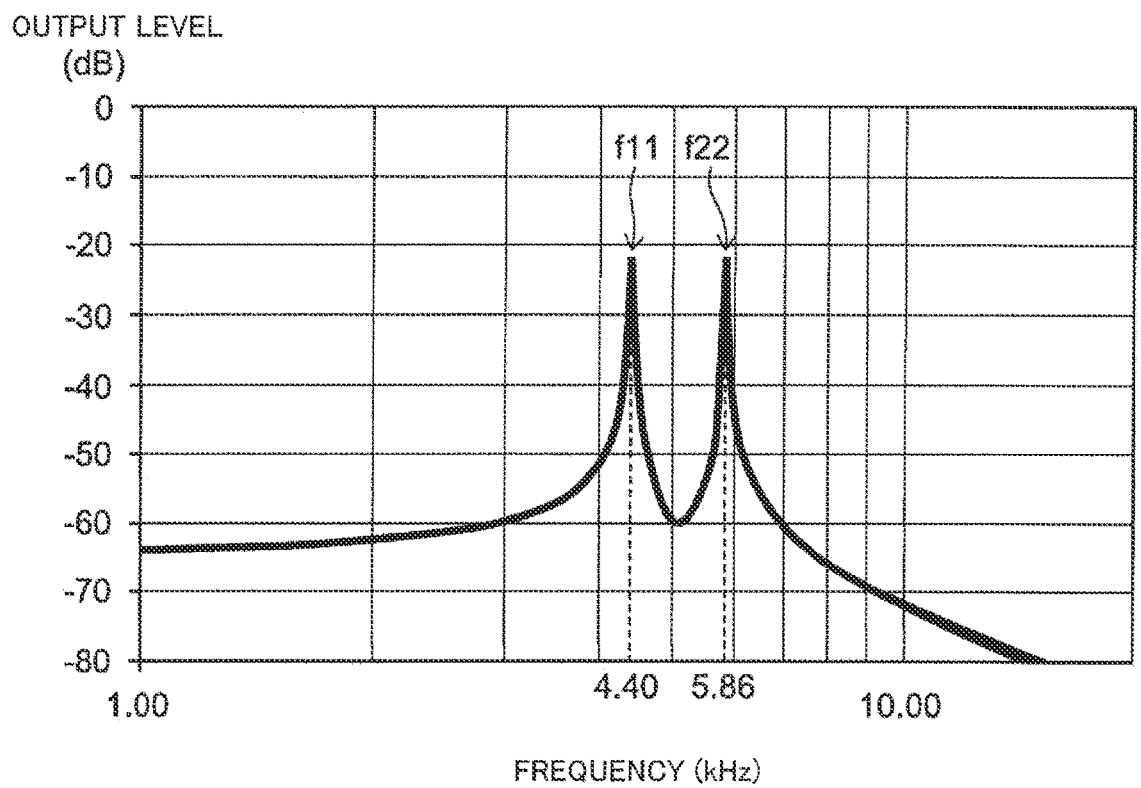
FIGS. 6A and 6B are diagrams for describing a waveform of focusing sound of the digital camera according to another embodiment.
Figure 6B:
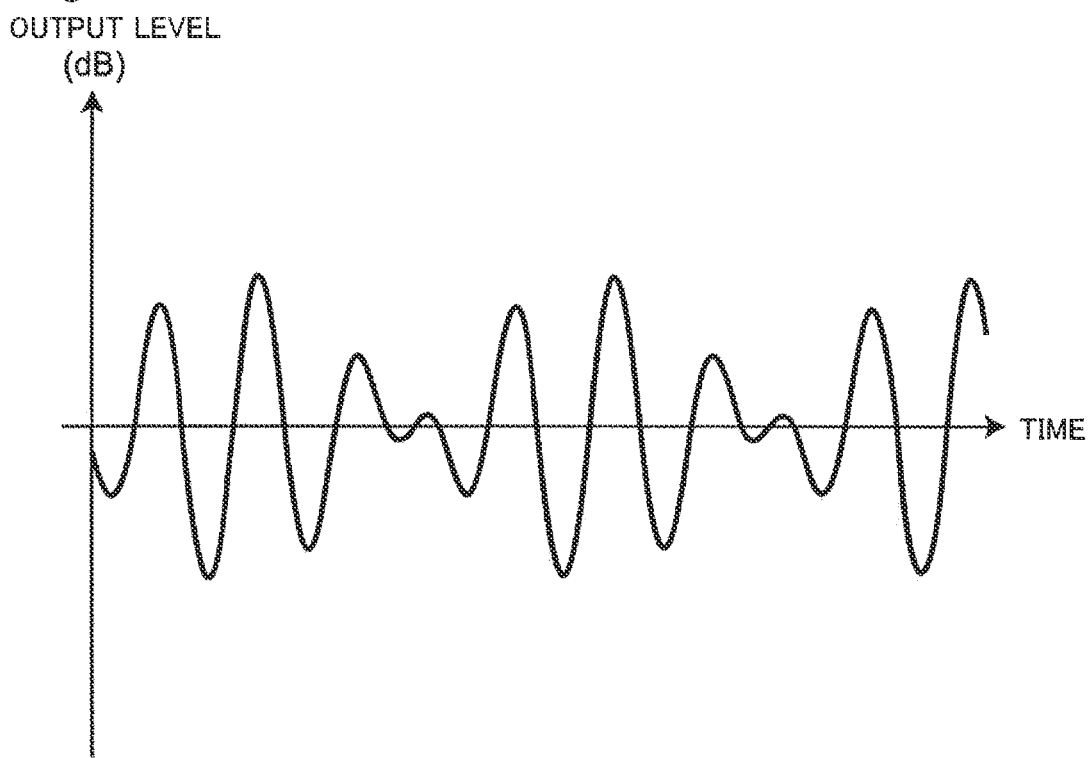

Although the digital camera 100 according to the first embodiment outputs focusing sound having the fundamental tone component f11 for which the sound output level peaks at frequency of 4.40 kHz, and the higher-pitched tone component f21 for which a sound output level peaks at frequency of 6.60 kHz, the present disclosure is not limited to this. FIG. 6A illustrates a modification of a frequency characteristic of focusing sound. FIG. 6B illustrates a waveform chart of focusing sound according to the modification. In the present embodiment, as illustrated in FIG. 6A, the digital camera 100 may output focusing sound that has a higher-pitched tone component f22 for which a sound output level peaks at frequency of 5.86 kHz, instead of the higher-pitched tone component f21 for which a sound output level peaks at frequency of 6.60 kHz. In this case, a frequency ratio of the fundamental tone component f11 to the higher-pitched tone component f22 is 3:4, thereby achieving a consonant chord of a perfect fourth. As illustrated in FIG. 6B, focusing sound in this case is output with periodicity of a waveform different from periodicity in a case of a perfect fifth (FIG. 5A).

Although the consonant chord of the focusing sound according to the first embodiment is perfect-fifth sound, and the consonant chord of the focusing sound according to a second embodiment is perfect-fourth sound, a consonant chord is not particularly limited to this.

A digital camera 1 according to the present embodiment includes an image sensor 115, a controller 135, and an annunciator 165. The image sensor 115 captures an object image entering via the optical system 110. The controller 135 controls focusing operation to focus the object image by the optical system 110. The annunciator 165 outputs focusing sound according to the focusing operation. The focusing sound may constitute a consonant chord of at least one of a perfect fifth and a perfect fourth.

In the above embodiment, the focusing sound includes a fundamental tone component of 4.40 kHz; however, the present disclosure is not limited to this. In the present embodiment, the focusing sound may include a fundamental tone component of another frequency.

In the example in FIGS. 5A and 5B, the time period T2 is 25 msec.; however, the present disclosure is not limited to this. From a viewpoint to allow a user to recognize each of a first sound wave and a second sound wave, a time period T2 may be a time period of 10 msec. or longer. For example, the time period T2 may be set between 10 msec. and 50 msec.

Although the amplitude A2 of the second sound wave according to the example in FIGS. 5A and 5B is substantially 3 dB greater than the amplitude A1 of the first sound wave, the present disclosure is not limited to this. From a viewpoint to allow the user to recognize that volume of the second sound wave is greater than volume of the first sound wave, the amplitude A2 of the second sound wave may be at least 3 dB greater than the amplitude A1 of the first sound wave.

Figure 7A:
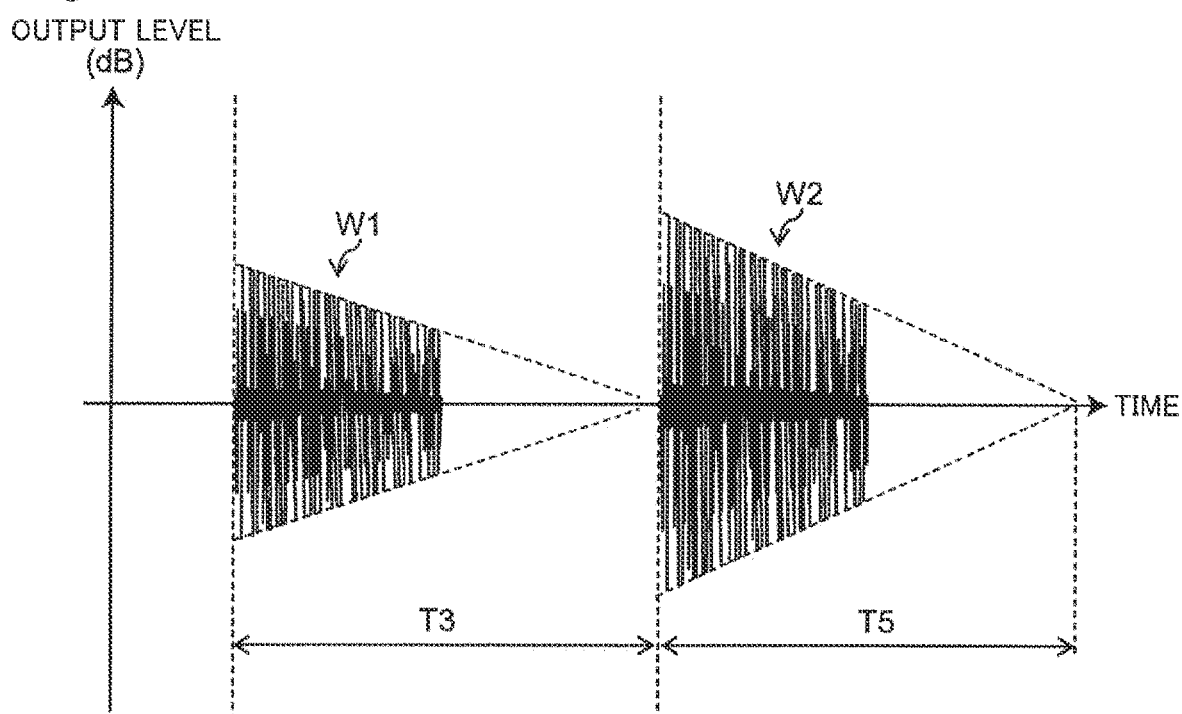
FIGS. 7A and 7B are diagrams for describing a waveform of focusing sound of the digital camera according to another embodiment.
Figure 7B:
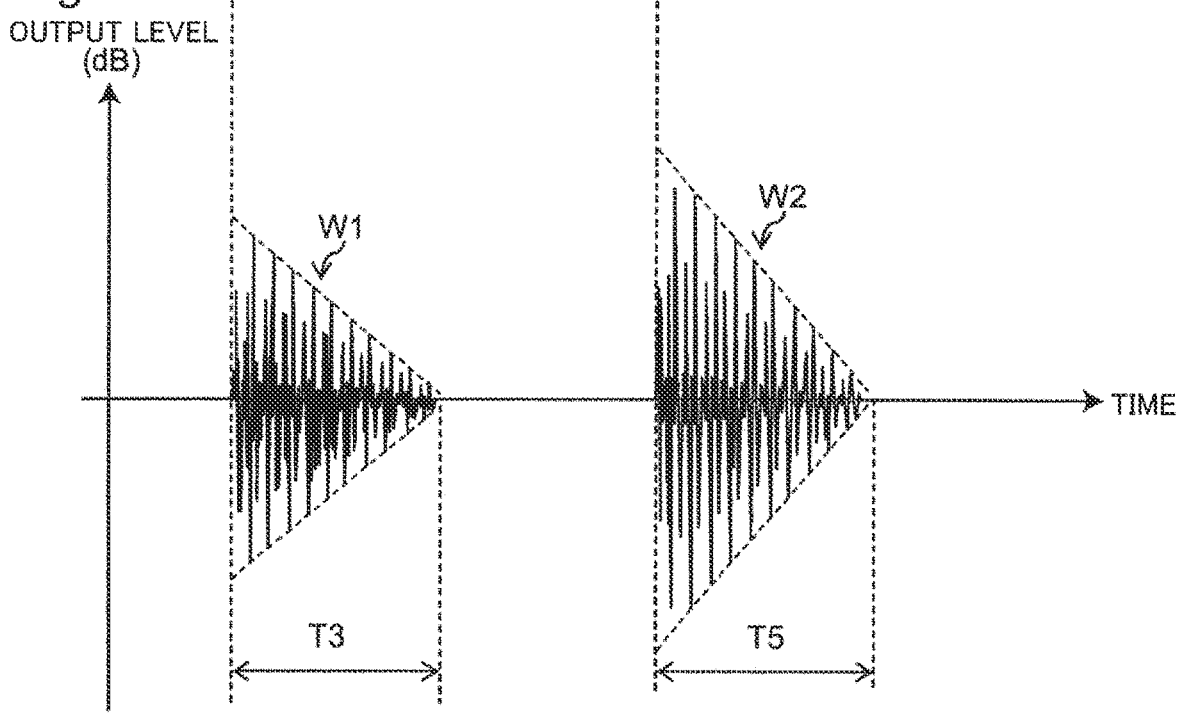

Although the annunciator 165 outputs a first sound wave W1 by adding a fade with a constant gradient so that amplitude becomes 0 after a lapse of 37.5 msec.(T3) in FIG. 5B, the present disclosure is not limited to this. For example, the annunciator 165 may output the first sound wave W1 by adding a fade with a gradient so that a time period T3 becomes shorter as frequency at which a sound output level peaks is lower. For example, as illustrated in FIG. 7A, the time period T3 is 50 msec. in a case where the first sound wave includes a fundamental tone component for which a sound output level peaks at 3.520 kHz, and a higher-pitched tone component for which a sound output level peaks at 5.280 kHz. Furthermore, as illustrated in FIG. 7B, the time period T3 is 25 msec. in a case where the first sound wave includes a fundamental tone component for which a sound output level peaks at 0.880 kHz, and a higher-pitched tone component for which a sound output level peaks at 1.320 kHz. A similar applies to a time period T5.

The annunciator 165 may include, but not limited to, a DA converter. For example, the DA converter may be included in the controller 135.

The annunciator 165 may output each of the sound waves W1 and W2 by adding a fade with, but not limited to, a constant gradient. For example, the annunciator 165 may output each of the sound waves W1 and W2 by adding a fade with a changing gradient.

In the above embodiment, the focusing sound constitutes a consonant chord with a fundamental tone component and a higher-pitched tone component; however, (peak) frequency of each component can be set within an allowable error range as appropriate. For example, the higher-pitched tone component may be set within a range from a quarter-tone lower interval to a quarter-tone higher interval with respect to frequency higher than frequency of the fundamental tone by a theoretical frequency ratio of a consonant chord. The higher-pitched tone component may be set within a bandwidth of a half width a peak of an output level of the sound that constitutes a consonant chord in FIG. 4.

In the above embodiment, the focusing sound is constituted from two sound waves W1 and W2; however, the focusing sound may be constituted from three or more sound waves. Although the focusing sound according to the present embodiment includes two sound components, which are a fundamental tone component and a higher-pitched tone component, three or more sound components may be included.

In the present embodiment, the digital camera 100 is not limited to a lens-integrated digital camera, but may be, for example, a lens-interchangeable digital camera.

As the above, the embodiments have been described as exemplification of the techniques in the present disclosure. To that end, the accompanying drawings and detailed description are provided.

Therefore, among the components described in the accompanying drawings and the detailed description, not only a component essential for solving a problem but also a component not essential for solving the problem may be included in order to exemplify the above techniques. Therefore, it should not be immediately recognized that these non-essential components are essential based on a fact that the non-essential components are described in the accompanying drawings and the detailed description.

Furthermore, because the above-described embodiments are for exemplifying the techniques in the present disclosure, various changes, replacements, additions, omissions, or the like, can be made within the scope of the claims or an equivalent scope.

INDUSTRIAL APPLICABILITY

The idea of the present disclosure can be applied to an electronic device (an imaging device such as a digital camera or a camcorder, a mobile phone, a smartphone, or the like) having an imaging function including a focusing function.

The invention claimed is:

1. An imaging device comprising:
an image sensor configured to capture an object image entering via an optical system;
a controller configured to control focusing operation to focus the object image by the optical system; and
an annunciator configured to output focusing sound indicating that the imaging device is in focus, according to the focusing operation,
wherein the focusing sound has a chord frequency characteristic of the focusing sound includes a first sound component based on first frequency, and a second sound component based on second frequency that is higher than the first frequency and lower than twice frequency of the first frequency.

2. The imaging device according to claim 1, wherein the first and second frequencies are set to cause the focusing sound to be a consonant chord with the first sound component and the second sound component.

3. The imaging device according to claim 2, wherein the consonant chord of the focusing sound is at least one of a perfect fifth or a perfect fourth.

4. The imaging device according to claim 1, wherein the annunciator is configured to output the focusing sound with fading the focusing sound out when the imaging device is in focus.

5. The imaging device according to claim 1, wherein the focusing sound includes a first sound wave and, a second sound wave output at an interval of a time period after the first sound wave is output, with amplitude of the second sound wave being greater than amplitude of the first sound wave.

6. An imaging device comprising:
an image sensor configured to capture an object image entering via an optical system;
a controller configured to control focusing operation to focus the object image by the optical system; and
an annunciator configured to output focusing sound that has a predetermined frequency characteristic, according to the focusing operation,
wherein the frequency characteristic of the focusing sound includes a first sound component based on first frequency, and a second sound component based on second frequency that is higher than the first frequency and lower than twice frequency of the first frequency,
wherein the first and second frequencies are set to cause the focusing sound to be a consonant chord with the first sound component and the second sound component,
wherein the consonant chord of the focusing sound is at least one of a perfect fifth or a perfect fourth, and
wherein the focusing sound includes a first sound wave and, a second sound wave output at an interval of a time period after the first sound wave is output, with amplitude of the second sound wave being greater than amplitude of the first sound wave.

7. The imaging device according to claim 6, wherein the annunciator is configured to output the focusing sound with fading the focusing sound out.

* * * * *